United States Patent

Constable

[15] 3,657,521
[45] Apr. 11, 1972

[54] ACCESS-CONTROL EQUIPMENT AND ITEM DISPENSING SYSTEMS INCLUDING SUCH EQUIPMENT

[72] Inventor: Geoffrey Ernest Patrick Constable, Cheltenham, England

[73] Assignee: Smiths Industries Limited, London, England

[22] Filed: Aug. 24, 1970

[21] Appl. No.: 66,182

[30] Foreign Application Priority Data

Aug. 25, 1969  Great Britain......................42,263/69

[52] U.S. Cl............................235/61.7 B, 179/1.5 S, 178/22
[51] Int. Cl. .........................................................G06k 7/01
[58] Field of Search.............235/61.7 B; 340/149 A; 283/17, 283/11; 35/3, 4; 178/22; 179/1.5

[56] References Cited

UNITED STATES PATENTS

| | | | |
|---|---|---|---|
| 3,221,304 | 11/1965 | Enikeieff.....................235/61.7 B UX |
| 2,984,700 | 5/1961 | Small......................................178/22 |
| 3,513,298 | 5/1970 | Riddle et al. .......................235/61.7 B |
| 3,051,783 | 8/1962 | Hell et al. ................................178/22 |
| 3,522,374 | 7/1970 | Abrahamsen et al....................178/22 |

Primary Examiner—Maynard R. Wilbur
Assistant Examiner—William W. Cochran
Attorney—William D. Hall, Elliott I. Pollock, Fred C. Philpitt, George Vande Sande, Charles F. Steininger and Robert R. Priddy

[57] ABSTRACT

A money-dispensing system is operative to dispense money in response to a bank customer's embossed credit card and keyed-entry of his personal-identification number, only if this number accords with the customer's account number read from an accounting record impressed from the card. The account number is translated by an encyphering unit into a significantly different number in which each digit is dependent upon the value of more than one of the account-number digits, before the comparison with the keyed-in number. The translation involves filling a shift register with binary-encodings dependent on the account-number digits and the results of repeated execution of an operation in which there is programmed assembly and additive combination of pairs of numbers from different stages of the shift register and feed back into the register of a number dependent on the result of the additive combination. The process of assembly and additive combination of numbers from different stages of the shift register, together with feedback to produce derived-number shifting of the register, is continued after the register has been filled with the account-number derived data, so as to generate the digits of the translated number successively and supply these for comparison in turn with the corresponding digits of the keyed-in number.

15 Claims, 3 Drawing Figures

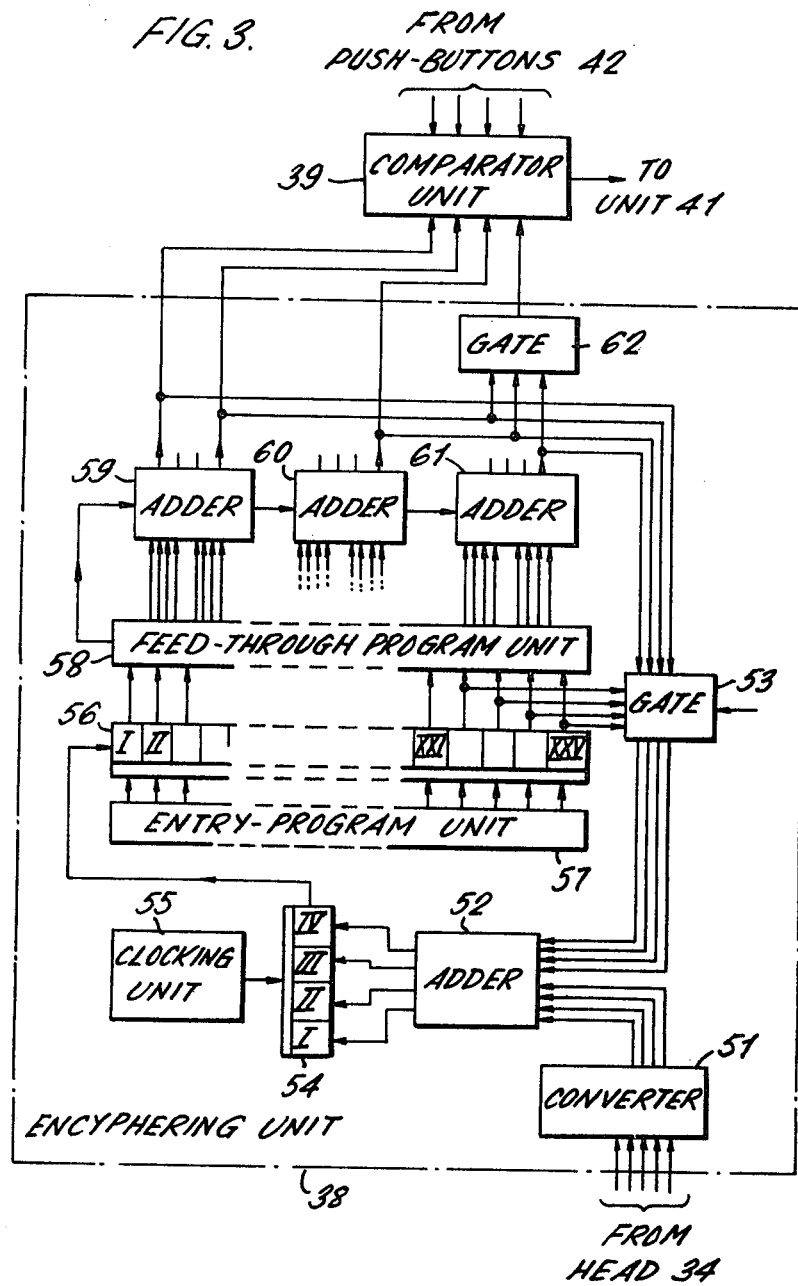

ACCESS-CONTROL EQUIPMENT AND ITEM DISPENSING SYSTEMS INCLUDING SUCH EQUIPMENT

This invention relates to access-control equipment and item-dispensing system including such equipment.

The invention is particularly concerned with access-control equipment of the kind for selectively enabling access to a facility under control of a token presented to the equipment. The token, for example, may in the form of a punched or embossed card, and each person authorized to make use of the facility may in these circumstances be issued with such a card punched or embossed with information individual to that person, for presentation to the equipment when access is required.

According to the present access-control equipment for selectively enabling access to a facility comprises means for reading a plural-character word from a token presented to the equipment, means for separately entering another plural-character word into the equipment, encyphering means arranged to translate a first of the two words into a different word using a sequence of encyphering operations, the result of each successive encyphering operation being dependent through feedback on the result of an earlier operation of the sequence, comparator means for comparing the second of the two words and the translated word with one another in order to detect whether a predetermined correspondence exists between the first and second words, and release means that is arranged to be operated to enable access to said facility only in the event that the predetermined correspondence is detected.

With the access-control equipment of the present invention there is the advantage that comparison between the two words entered into the equipment is made only after one of them has been translated into a different word. The translation performed by the encyphering device, being dependent on a sequence of operations with feedback can readily be made so complex that it precludes to all reasonable extent deduction from either entered word of the other word it is necessary to enter in order to achieve the required correspondence. The degree of security obtainable in the latter respect can readily be such that there is no need for the word borne by the token to be concealed. This is of special advantage in that it allows for economy in token-construction and for use of the same word for other purposes; where, for example, an account of use of the facility is required, then the token-borne word can be provided as a number or alpha-numeric that is visible on the token and can be used directly for identification purposes in the account.

The plural-character words involved in the equipment may be entirely numerical and representations of these may be dealt with in serial or parallel mode or in combinations of these, within the equipment. The separately entered word may conveniently be entered through manually operable means, for example a set of push-buttons or a dial mechanism comparable with a telephone dial, provided in the equipment, so that the particular word entered in this way is dependent on manual selection.

The encyphering means may include a multi-stage shift register, and in these circumstances the said first word, which may be either the word read from the token or the word entered separately, may be translated through successive feedback operations into a multi-digit number in the shift register. The encyphering means may in this respect execute a process that comprises the successive steps of assembling a plurality of numbers by grouping together representations of the digits stored in different stages of the shift register, combining the assembled numbers with one another arithmetically, and feeding back into the shift register a numerical value dependent on the result of the arithmetical combination. This process may be executed repeatedly in the translation of the said first word into the multi-digit number, and also in a translation of this number to a form for comparison by the comparator means with said second word.

The access-control equipment of the present invention may be arranged to control access to any form of facility, for example, entry to a restricted area, use of a service, or withdrawal of an item in predetermined or selected quantity. One particular application of the equipment is in the field of banking where money-dispensing systems are provided for use by customers at all times, the customers being issued with individual coded-tokens for presentation to any one of the dispensing systems when withdrawal of money is required. The equipment of the present invention in this latter connection may be arranged to control an item-dispensing means that is operable to dispense money (for example, in bank-note form) to the customer in response to each valid 'request' for withdrawal, a 'valid' request in this context involving, at least, presentation to the equipment of a token and separate entry into the equipment of a word having an appropriate predetermined correspondence with a word borne by the token.

An item-dispensing system for use in dispensing money and including access-control equipment according to the present invention, will now be described, by way of example, with reference to the accompanying drawings, in which:

FIG. 3 shows in block schematic form details of an encyphering unit of the system of FIG. 1.

Figure 1:
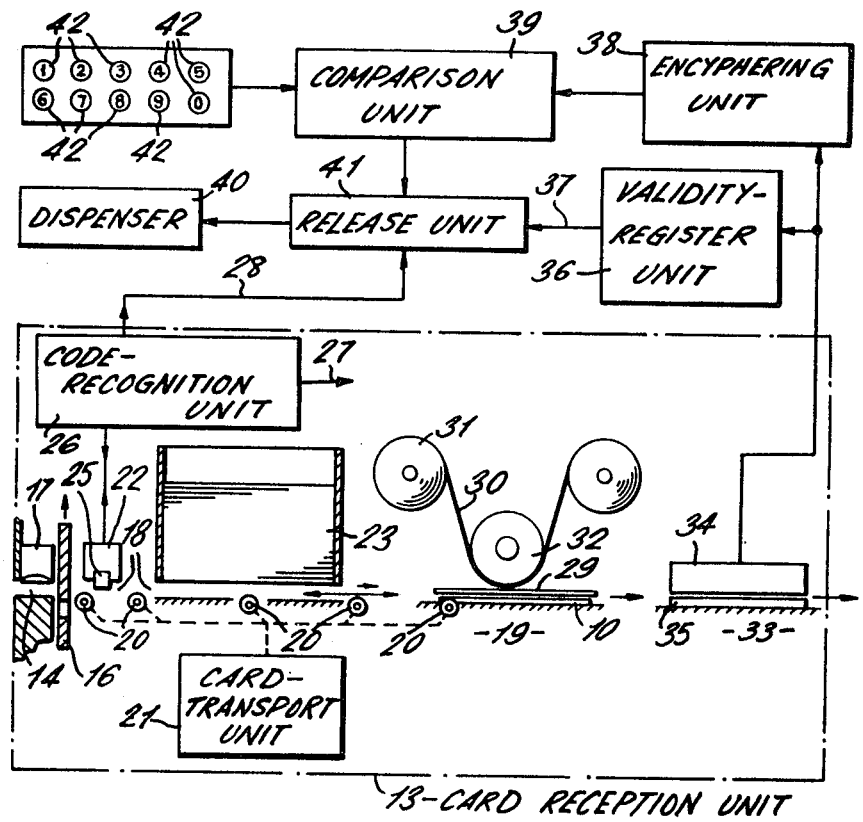
FIG. 1 is a schematic representation of the money-dispensing system.
Figure 2:
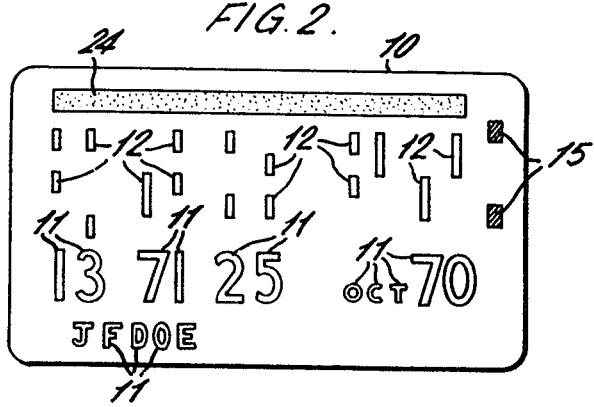
FIG. 2 shows the form of an information-bearing token used with the system of FIG. 1.

The money-dispensing system represented in FIG. 1 is operable to dispense packets of bank-notes, one at a time to authorized customers of a bank after, as well as during, normal banking hours. The customers authorized to use the system are each issued with a coded token in the form of a rectangular plastics card 10 that may be used generally as a credit card. Each card 10, as shown in FIG. 2, bears the date of expiry and numerical information identifying the account of the customer to whom the card has been issued, and this information, as well as being embossed directly on the card in alpha-numeric characters 11, is embossed thereon according to a two-out-of-five decimal code using bar-characters 12.

Each customer is informed of a secret, person-identification number that is individual to his account but cannot be deduced from the card 10 itself, and of a maximum, permissible rate of use of the card to withdraw packets of bank-notes. For the purposes of the present description it will be assumed that the maximum rate of withdrawal is once in any day.

When the customer wishes to withdraw a packet of bank-notes he presents his card 10 to a card-reception unit 13 of the system. The unit 13 has a facia that is mounted in an external wall of the bank to be accessible from outside and provide an entrance 14 for the card 10. The card 10, which as shown in FIG. 2 carries dark markings 15 at one end, is inserted in the entrance 14 lengthwise with the embossings 11 and 12 uppermost and with the markings 15 just within the unit 13. Entry of the card 10 further is blocked by an apertured shutter 16 until the existence, with appropriate location on the card 10, of the markings 15 is detected by a photoelectric detecting arrangement 17. Detection of the appropriately located markings 15 causes the shutter 16 to be lifted to admit the card 10 fully to the unit 13 through the entrance 14.

The card 10 admitted fully to the unit 13 is drawn lengthwise along a guideway 18 to an imprinter 19 by rollers 20 that are driven by a card-transport unit 21. In its passage along the guideway 18 the card 10 passes successively beneath a reading-recording head-unit 22 and a stack 23 of punched-card blanks. The head unit 22 reads from the card 10 withdrawal-rate information that is recorded magnetically in a strip 24 of ferromagnetic oxide inset, as indicated in FIG. 2, lengthwise of the card 10. The information in this case is provided by the date on which the card 10 was last used, and this date is recorded in binary-coded form as modulation of the frequency of an alternating-current signal that is recorded throughout the length of the strip 24.

The recording in the strip 24 is made using a special form of magnetic head having a recording gap of zigzag configuration, and so is characterized by a correspondingly crooked pattern of magnetization departing substantially from the pattern of straight, transverse bands produced using a conventional, straight-gap head. It is only by using the same head, or one having the same zigzag configuration of gap, that the recorded withdrawal-rate information can be read intelligibly from the card 10; the head unit 22 includes a magnetic head 25 having this specific crooked configuration of gap. The head 25 is located to lie over a point in the path of the strip 24 along the guideway 18, so as to read out the withdrawal-rate information from the strip 24 of the transported card 10.

Signals in accordance with the recorded withdrawal-rate information read from the card 10 by the head 25 are supplied from the unit 22 to a code-recognition unit 26. The signals are there used as the basis for two security checks. The first of these is a check on the authenticity of the request for money, to the extent that the unit 26 checks that the level of the signals read out from the card 10 exceeds a predetermined threshold value. This check is satisfied, and a signal is as a result supplied on a lead 27, only if the recording in the strip 24 has the characteristic zigzag pattern of magnetization referred to above. In general it is not possible to satisfy this check unless the head used for recording had the prescribed zigzag form of gap. Records made using a head having a conventional straight gap will not produce signal levels in the head 25 sufficient to exceed the threshold value set, and the same applies to a significant extent to recordings made using heads of a crooked configuration differing from that of head 25.

The second check carried out in the unit 26 determines from the withdrawal-rate information read from the card 10 whether the dispensing of money to the customer would cause him to exceed the maximum permissible withdrawal rate. To this end the signals supplied by the unit 22 are decoded in the unit 26 to determine whether the date they represent is prior to the current date. If it is, and the once-in-a-day rate would accordingly not be exceeded, an output signal indicative of this fact is supplied from the unit 26 to a lead 28. The supply of this signal to the lead 28, which as described later is a prerequisite for the dispensing of money to the customer, is inhibited in the event that no signal is supplied to the lead 27. Thus the signal appears on the lead 28 after passage of the received card 10 beneath the head unit 22, only in the event that both checks carried out in the unit 26 are satisfied.

From the head unit 22 the card 10 passes beneath the stack 23 of punched-card blanks, and as shown in FIG. 1, carries with it into the imprinter 19 the lowermost blank 29. A carbon ribbon 30 fed from a supply spool 31 within the imprinter 19, is pressed downwardly by a roller 32 on to the blank 29 as this is driven with the card 10 into the imprinter 19. The card 29 is accordingly imprinted in carbon-ink with the embossed characters 11 and 12 of the card 10. The ribbon 30 is of the 'total transfer' kind, the carbon ink transferred on the blank 29 at the embossings 11 and 12 leaving transparent windows that provide another, supplementary record of the card 10. The imprinted blank 29, providing the principal record, is now separated from the card 10 and passes through a photoelectric card-reader 33, leaving the card 10 behind in the imprinter 19.

The imprinted blank 29 passes between a reading head 34 and a platen 35 in the card reader 33. The head 34 includes five photocells (not shown) for sensing the imprints of the bar-characters 12 and providing therefrom a column-by-column readout of the imprinted decimal-encoding. Signals in accordance with the account number and expiry date read out in this way are supplied to a validity-register unit 36. The expiry date and account number are here checked to ascertain whether the card 10 is still in force and not otherwise invalid; in the latter respect the unit 36 checks the account number against the account numbers of customers's cards that are no longer valid by virtue of having been reported as lost or stolen. If the result is satisfactory on both counts, then a signal indicative of this is supplied from the unit 36 to a lead 37.

The signals representative of the account number read out from the imprinted blank 29 are also supplied from the unit 33 to an encyphering unit 38 which acts according to an involved and secret program to derive from this number the corresponding personal-identification number. The derivation of the personal-identification number from the account number within the unit 38 involves a chain-code sequence of digit-deriving steps of each of which is dependent on cross-connections programmed into the unit 38. The cross-connections determine the initial condition from which the sequence begins and the manner in which during each digit-deriving step numbers dependent on an individual digit of the account number are assembled and combined with one another to produce further numbers. These further numbers are used in part to define the value to be ascribed to the digit of the personal-identification number that is being derived in the step, and also to provide feedback affecting the result of the next step in the derivation of the complete personal-identification number corresponding to the account number borne by the card 10. Signals in accordance with this derived number are conveyed to a comparison unit 39 that controls release of a bank-note dispenser 40 via a release unit 41.

The customer is now instructed by illumination of a sign (not shown) on the facia of the unit 13 to enter his personal-identification number into the system. The number, preferably of six digits, is entered using a set of 10 push-buttons 42 mounted on the facia of the unit 13 and numbered 0 to 9. As the push-buttons 42 are operated one at a time to enter the digits sequentially, their values are conveyed to the comparison unit 39. In the unit 39 the manually entered number is compared digit-by-digit with the number derived from the account number in the encyphering unit 38. If there is correspondence between them and the appropriate signals are present on the leads 28 and 37 to signify that the checks as to authenticity, withdrawal-rate and validity carried out in the units 26 and 36 are all satisfied, then the unit 41 releases the dispenser 40 to dispense a single packet of bank-notes to the customer through a delivery-slot (not shown) in the facia of the unit 13. Once dispensing has taken place the card transport unit 21 drives the rollers 20 to transport the card 10 back from the imprinter 19 to be returned to the customer through the entrance 14. The head 25 in the unit 22 is appropriately energized from the unit 26 during this to record this current date (in the characteristic frequency-modulated and crooked form) in the strip 24 of the card 10, and thereby up-date the withdrawal-rate information on the card.

The unit 41 does not release the dispenser 40, and no dispensing therefore takes place, in the event that the numbers compared by the unit 39 do not correspond, or any of the three checks on authenticity, withdrawal-rate and validity carried out by the units 26 and 36, are not satisfied. In the circumstances in which there is no correspondence between the compared numbers, or the check on withdrawal rate is not satisfied, the card 10 is returned but without any up-dating of the withdrawal-rate information in this case. The card 10 is however driven from the imprinter 19 to be retained in a safe bin (not shown) within the system, in the event that either of the authenticity- and validity-checks is not satisfied; the criterion for retention and the operation of the unit 21 to this end, is absence of a signal from either of the two leads 27 and 37. In all case where there is no dispensing, the imprinted punched-card blank 29 is stamped (by means not shown) to indicate this.

The blank 29 imprinted with the information from the card 10 and retained within the system provides a record of the transaction, whether successful or not, for the necessary accounting and checking purposes. The main basis for the dispensing operation is the information, in particular the account number, encoded on the card 10, and the fact that this is read from the imprinted blank 29 rather than from the card 10 itself, is of substantial advantage. In particular it ensures that the dispensing operation is conditional upon there being an accurate and legible record of the transaction. The use of the imprinted record 'in the loop', as an essential part of the dispensing operation in this way, is the subject of my earlier U.S. Pat. application Ser. No. 851,186, filed Aug. 19, 1969.

The security of the system is dependent on the security of the effective programmed-derivation by the encyphering unit 38 of the personal-identification number corresponding to the account number on the card 10. The number derived is used for checking the correctness of the number entered by the customer through the push-buttons 42, and in this is the key to an authentic link between customer and card, established by the system as a principal criterion for the dispensing of money. The program performed by the encyphering unit 38 therefore ensures that the derived number is uniquely related to the account number but cannot be deduced from it alone or on the basis of a ready analysis of the relationship between the personal-identification numbers corresponding to other account numbers. The construction of the encyphering unit 38 will now be described with reference to FIG. 3.

Referring to FIG. 3, the signals representative of the customer's account number and received by the encyphering unit 38 from the reading head 34, are supplied to a code converter 51. The signals received in respect of each account-number digit are converted by the converter 51 from the two-out-of-five bar-code to a four-bit binary-coded decimal form. The resultant four-bit number is conveyed from the converter 51 to an adder 52, and is there added to another four-bit number conveyed to the adder 52 from a gate unit 53. The four-bit sum derived by the adder 52 is stored in a four-stage shift-register 54 that is controlled by a clocking unit 55. The unit 55 provides a train of four clock pulses in response to the reading of each account-number digit in turn from the imprinted card 29, and this train serves to transfer the four-bit sum stored in stages I to IV of the register 54, bit by bit into a shift-register 56 having 25 stages I to XXV.

The initial setting of the shift register 56 is determined by an entry-program unit 57. The unit 57 clears the register 56 at the beginning of each customer-request for money, and then enters into it a secret binary number of 25 digits. This secret number is determined solely by jumpering, that is to say a pattern of cross-connections, that is effected by one or more printed-circuit boards (not shown) plugged into the unit 57.

Signals in accordance with the bits stored at any time in the 25 stages I to XXV of the register 56 are applied to a feed-through program unit 58. The unit 58 jumbles up the order of the signals derived from stages I to XXIV and regroups them as representations of six four-bit numbers. These numbers are conveyed in pairs to three adders 59 to 61. This scrambled assembly of the pairs of numbers from the bits stored in the 24 stages I to XXIV of the register 56 is determined by cross-connections that are effected by one or more plug-in printed-circuit boards (not shown) in the unit 58. The cross-connections effected include a connection from stage XXV of the register 56 to convey the bit stored in that stage as a carry-forward input to the adder 59.

The adders 59 to 61 are interconnected to provide a carry-forward from the adder 59 to the adder 60 and from the adder 60 to the adder 61, and the three four-bit sums derived by them are used in the formation of a four-bit number that is fed back through the gate unit 53. The four bits of this number are formed by the least- and most-significant bits of the sum provided by the adder 59 and by the most-significant bits of the sums provided by the adders 60 and 61. The gate unit 53 passes the number formed in this way on to the adder 52 as each individual account-number digit is read out by the head 34, and so the four-bit numbers conveyed in turn into the register 56 from the adder 52 in response to the successive account-number digits, are dependent not only on the values of the individual account-number digits but also on the four-bit numbers formed in turn from the outputs of the adders 59 to 61. The state of the shift register 56 after the last account-number digit has been read out and entered, has in consequence a complex and unique relationship to the account number, that is dependent both on the number entered initially from the entry-program unit 57 and the feed-through program set up in the unit 58. It is not until the last digit of the account number has been read out and the shift register 56 has settled, that the customer is instructed to enter his personal-identification number through the push-buttons 42.

As the customer operates the push-buttons 42 in turn so representations of the digits entered by him are conveyed in a four-bit binary-coded decimal form to the comparator unit 39. The clocking unit 55 supplies a train of four clock pulses to transfer the content of the register 54 into the register 56, in response to the signalling of each digit. The content of the register 54 is at this time the four-bit sum of the four-bit number stored in stages XXII to XXV of the register 56 and the four-bit number formed from the outputs of the adders 59 to 61. These two numbers are added together at the gate unit 53 and the relevant sum is in each case fed through to the register 54 ready for the signalling of the next personal-identification digit by the customer (it is only during the signalling of the digits of the personal-identification number, when there is no output from the converter 51, that the four bits stored in stages XXII to XXV are involved in the feedback). The state of the register 56 accordingly changes throughout the signalling sequence, producing a new four-bit number at the output of the adders 59 to 61 as each new digit is entered. The four-bit number, as well as being fed back, is used as the basis for a check on the value of the entered digit, carried out in the comparator unit 39.

The four-bit number formed from the outputs of the adders 59 to 61 is to base 16 and before it is conveyed to the comparator unit 39 from the unit 38 it is submitted to a conversion process that restricts it to base 10. This process is performed by a gate unit 62 that is operable to change the value of the most-significant bit before this is conveyed from the adder 61 to the comparator unit 39. The gate unit 62 makes the change only in circumstances in which the value of the most-significant bit is "1", and then only if the value of either of the second- and third-significant bits supplied by the adders 60 and 59 respectively, is "1" also; it is only in the circumstances in which one or both of the second- and third-significant bits has the value "1", that the binary number can exceed nine, and then only if the value of the most-significant bit is "1".

The four-bit number to base ten conveyed from the unit 38 in response to each digit signalled by the customer, is added within the unit 39 to the four-bit representation of that digit. Correspondence is taken to exist between the two binary-coded decimal numbers only if their four-bit binary sum is "1111" Thus as the customer operates the push-buttons 42 to enter his personal-identification number, successive digits of a decimal check number uniquely related through the entry and feed-through programs to the account number on the card 10, are added to the signalled digits in the unit 39. The additions are made without carry, and it is only in the event that the result of each is binary "1111" that a signal signifying correspondence is emitted on the lead 41.

The relationship between the check number derived by the unit 38 and the customer's account number can be readily changed by changing the cross-connections made within either or both of the units 57 and 58. Such a change necessarily implies a reallocation of personal-identification numbers in order to maintain correspondence with the account numbers, but will in general be sufficient to establish a new, independently secure numbering system.

The once-in-any-day withdrawal-rate used in the system described with reference to FIG. 1 is simple in that it enables the necessary record of prior use to be recorded on, and read from, the customer's card as a single date. Clearly where a withdrawal-rate allowing a plurality of withdrawals in any period, is prescribed, more data will normally be involved. For example, a withdrawal-rate of three times in any one day, or ten times in any period of 7 days, might be prescribed, but in any case, the operation of the system described above in monitoring and up-dating the withdrawal-rate data recorded on the customer's card remains essentially the same; the only significant difference lies in the necessity to deal with, and process, more data.

It may furthermore be desirable to limit the extent to which the customer's card my be used, for example to limit its use to 50 withdrawals. This limitation, which may be provided in addition, or as an alternative, to the rate-of-use limitation, may be effected by recording an appropriate number of pulses on the card and erasing one of these on each successful transaction, the equipment acting to detect the existence of one or more pulses remaining on the card before each transaction and to inhibit operation of the dispenser 40, and retain the card, in the event that there are none. The pulse may be recorded magnetically using a magnetic head with a crooked gap-configuration, and the unit 22 in the card-reception unit 13 may then include a corresponding head simply for detecting the recorded pulses; the erasure can be effected using a normal straight-gap head that is energized to erase from the card 10 the first pulse detected by the crooked-gap head. The head with the crooked gap used in these specific circumstances is required only to read and not to record, and in this case may be constructed to have an inherently poor reading characteristic so that even if it is stolen it is of little value for fraudulent purposes.

Constructional details and uses of magnetic heads having a crooked gap-configuration, are described at greater length in my co-pending U.S. Pat. application Ser. No. 66,181, filed Aug. 24, 1970. Furthermore, there is described in the above-mentioned application Ser. No. 851,186, and in U.S. application Ser. Nos. 851,301 and 851,187, both filed Aug. 19, 1969 in the names of, respectively, W. E. Randall and G. E. P. Constable, and G. E. P. Constable and D. A. Lloyd, a form of money-dispensing system that involves on-line communication between each of a number of money-dispensing terminals and a central station that serves to check and up-date the account-status of each customer making a request for withdrawal of money; although the system described in the present specification is not of this form, the invention is nonetheless just as applicable to on-line systems.

I claim:

1. Access-control equipment for selectively enabling access to a facility, comprising means for reading a plural-character word from a token presented to the equipment, means for separately entering another plural-character word into the equipment, enciphering means for translating a first of the two words into a different word using a sequence of enciphering operations, the result of each successive enciphering operation being dependent through feedback on the result of an earlier operation of the sequence and said enciphering means including means to derive characters of the translated words which are each dependent upon more than one of the characters of the said first word, comparator means for comparing the second of the said two words and the translated word with one another to detect whether a predetermined correspondence exists between the first and second words, and release means that is operable to enable access to said facility only in the event that the predetermined correspondence is detected by said comparator means.

2. Access-control equipment according to claim 1 including means for conveying the word read from the token to said encyphering means for translation as aforesaid.

3. Access-control equipment according to claim 1 wherein said means for separately entering a plural-character word is means that is operable manually to enter a word that is dependent on manual selection applied to this means.

4. Access-control equipment according to claim 1 wherein the means for reading a plural-character word from the token comprises means for making a record of information borne by the token, and means for reading from said record at least part of the information recorded thereon.

5. Access-control equipment according to claim 4 wherein said means for making a record is means for imprinting a record medium for embossings on the token.

6. Access-control equipment for selectively enabling access to a facility, comprising: means for reading a plural-character word from a token presented to the equipment; means for separately entering another plural-character word into the equipment; enciphering means for translating a first of the two words into a third word using a sequence of enciphering operations, the result of each successive enciphering operation being dependent through feedback on the result of an earlier operation of the sequence, and said enciphering means including a multi-stage shift register, processing means operative to translate said first word through successive feedback operations into a multi-digit number in the shift register, and means to derive each successive character of said third word as dependent on values of programmed combinations of digits of the multi-digit number in the shift register; comparator means for comparing the second of said two words and the third word with one another to detect whether a predetermined correspondence exists between the first and second words; and release means that is operable to enable access to said facility only in the event that the predetermined correspondence is detected by said comparator means.

7. Access-control equipment according to claim 6 wherein said processing means is operative to execute a process that comprises the successive steps of assembling a plurality of numbers by grouping together representations of digits stored in different stages of the shift register, combining the assembled numbers with one another arithmetically, and feeding back into the shift register a numerical value dependent on the result of the arithmetical combination.

8. Access-control equipment according to claim 7 wherein said processing means is operative to execute said process repeatedly in translation of said first word into a multi-digit number in the shift register.

9. Access-control equipment according to claim 8 including means operative during the translation of said first word into the multi-digit number to apply numerical values corresponding to successive characters of said first word for entry into the shift register in turn, and wherein said processing means is operative to execute said process in association with each such character-dependent entry into the shift register.

10. Access-control equipment according to claim 7 wherein said means for deriving the characters of said third word is means operative to translate the multi-digit number into said third word through a process involving further repeated executions of said process executed by said processing means.

11. Access-control equipment according to claim 1 in combination with dispensing means that is responsive to operation of the said release means to perform a dispensing function.

12. An item-dispensing system comprising means providing an entrance for admitting an information-bearing token presented to the system, token-reading means for reading a plural-character word from the admitted token, manually operable means for separately entering a plural-character word into the system character by character, the particular word entered being dependent on manual selection applied to the manually operable means, enciphering means for translating a first of the two words into a different word through a sequence of enciphering operations, the result of each successive enciphering operation being dependent through feedback on the result of an earlier operation of the sequence of said enciphering means including means to derive successive characters of the translate word which are each dependent upon successive combinations of the characters of the said first word, comparator means for comparing the second of the two words and the translated word with one another character by character to detect whether a predetermined correspondence exists between said first and second words, item-dispensing means that is operable to dispense from a reserve of items at least one such item upon each operation of the item-dispensing means, and means for enabling operation of the item-dispensing means only in the event that said predetermined correspondence is detected by the comparator means.

13. An item-dispensing system according to claim 12 wherein the token-reading means comprises recording means for making a record of information borne by the token, and means for reading from this record part at least of the recorded token-information.

14. An item-dispensing system according to claim 13 wherein the recording means is means for making said record by imprint from embossings on the token.

15. Access-control equipment according to claim 6 including entry-program means coupled to the shift register for setting in accordance with a predetermined program the initial numerical content of the shift register for the said translation of said first word into the multi-digit number.

* * * * *